May 13, 1952 H. G. FITZ GERALD 2,596,394
OPAQUE PROJECTOR WITH LIGHT HOOD
Filed May 23, 1949 3 Sheets-Sheet 1
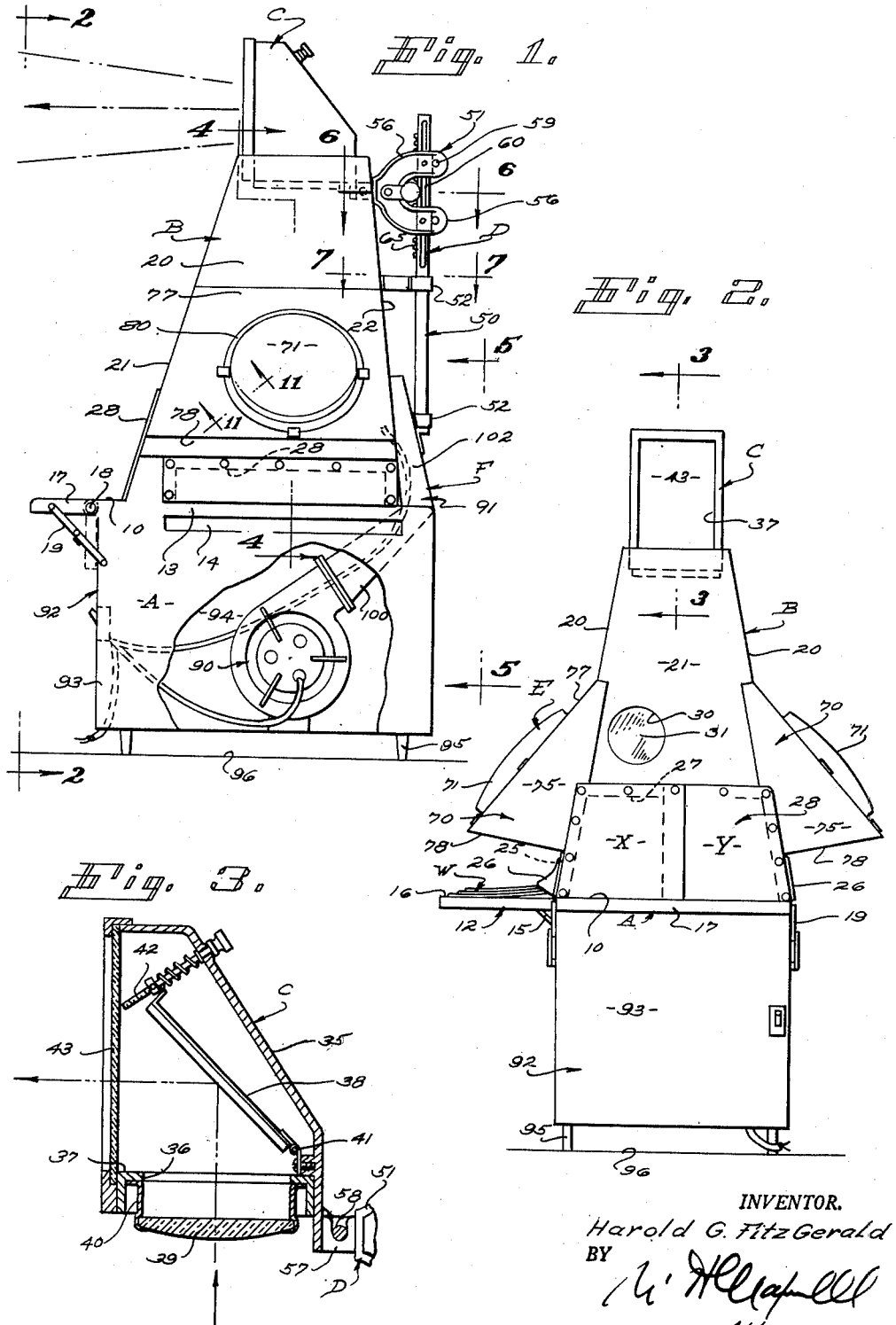
INVENTOR.
Harold G. FitzGerald
BY
Attorney May 13, 1952    H. G. FITZ GERALD    2,596,394
OPAQUE PROJECTOR WITH LIGHT HOOD
Filed May 23, 1949    3 Sheets-Sheet 2
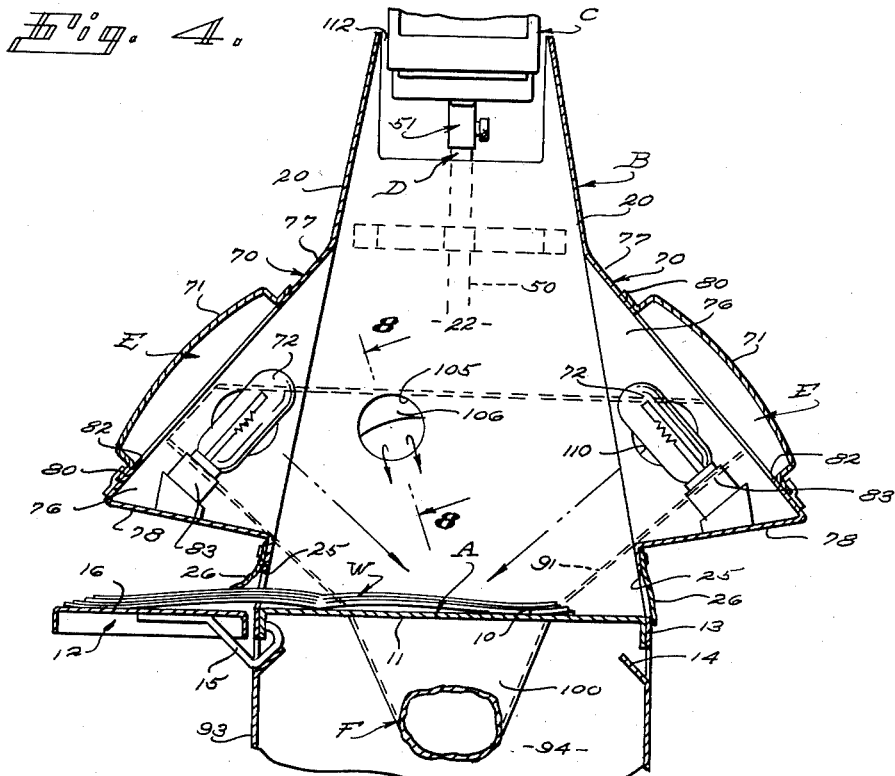
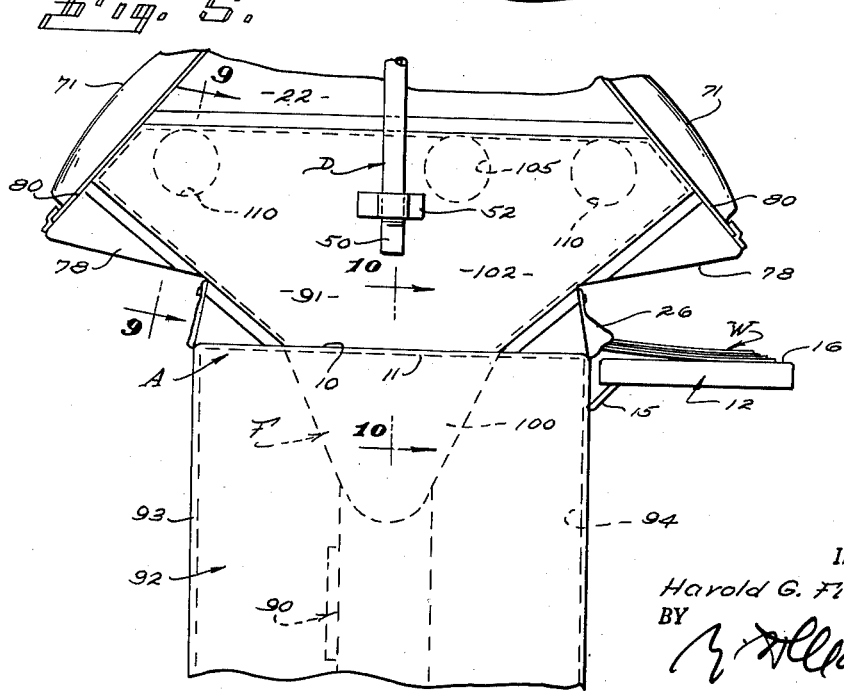
INVENTOR.
Harold G. FitzGerald
BY
Attorney May 13, 1952     H. G. FITZ GERALD     2,596,394
OPAQUE PROJECTOR WITH LIGHT HOOD
Filed May 23, 1949     3 Sheets-Sheet 3
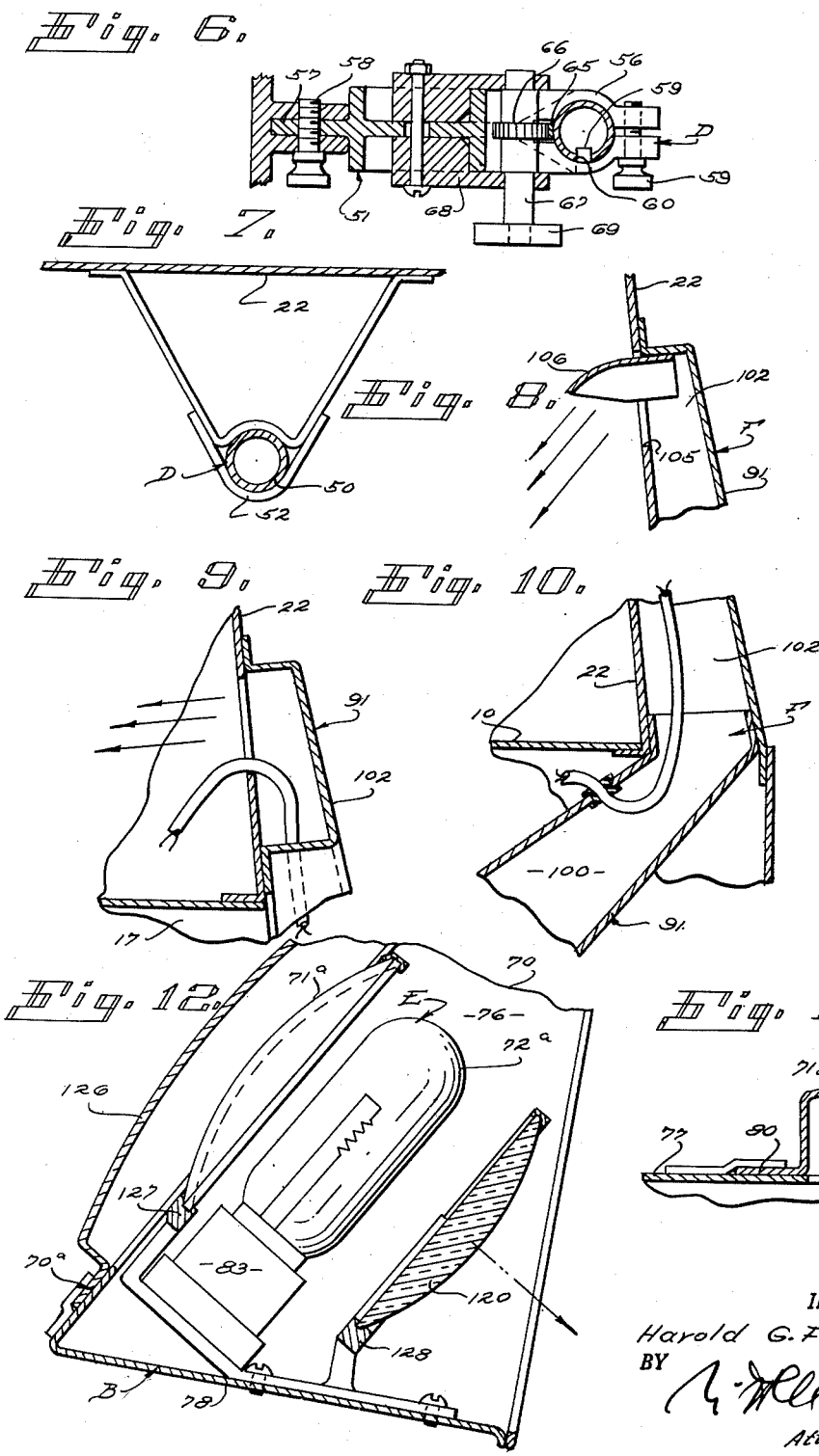
INVENTOR.
Harold G. FitzGerald
BY
Attorney Patented May 13, 1952

2,596,394

UNITED STATES PATENT OFFICE 2,596,394

OPAQUE PROJECTOR WITH LIGHT HOOD

Harold G. Fitz Gerald, Los Angeles, Calif.

Application May 23, 1949, Serial No. 94,914

2 Claims. (Cl. 88—26)

This invention relates to an opaque projector with light hood, it being a general object of the invention to provide a simple, effective, improved projector of the general type commonly referred to as an opaque projector.

The present invention is concerned with that general class of projector wherein reflected light from an object or from work is directed onto a screen or the like. The projectors of the character mentioned are practical in various situations, for example, they can be used to advantage in connection with sales demonstrations, educational work, lectures, etc. This type of projector ordinarily is employed to cast or project images of objects or work such as papers, books, illustrations, etc.

A general object of the present invention is to provide a projector of the general character referred to which is such that the operator may conveniently, safely, and without discomfort handle the work or object being projected, as for example, the operator may write upon, manipulate, or otherwise handle or act upon work as an image thereof is being projected, so that such actions of the operator are observable on the screen.

Another general object of the invention is to provide a projector of the general character referred to involving a unique, simple, highly effective illuminating means by which the work or object is strongly illuminated and is so illuminated that a marking or indicating device, or the hand of an operator over the work being projected, does not cast disagreeable or obscuring shadows.

Another object of the invention is to provide apparatus of the general character referred to wherein a light handling hood is so related to a work support or platform as to enable the operator to conveniently handle work, for instance, to advance papers, books, or other articles in the apparatus, as for instance, from one side to the other, while the operator's hand is inserted into the hood to manipulate, mark, indicate, or otherwise act upon the work at the region being projected.

Another object of the invention is to provide apparatus of the general character referred to including cooling means which includes an air circulating device and a distributing system such as to effectively cool the sources of illumination and the object being projected, or the hand of the operator at the object being projected, all to the end that the apparatus is maintained in a safe, comfortable, working condition, even though powerful sources of illumination are employed in order to gain brilliant illumination of the work.

The various objects and features of my invention will be fully understood from the following detailed description of typical preferred forms and applications of the invention, throughout which description reference is made to the accompanying drawings, in which:

Fig. 1 is a side elevation of the projector provided by the present invention with a part broken away to illustrate mechanism within the structure. Fig. 2 is a front elevation of the projector, being a view taken as indicated by line 2—2 on Fig. 1. Fig. 3 is an enlarged detailed sectional view of the projector head, being a view taken as indicated by line 3—3 on Fig. 2. Fig. 4 is an enlarged detailed vertical sectional view of a part of the structure, showing mainly the hood and being a view taken as indicated by line 4—4 on Fig. 1. Fig. 5 is an enlarged rear elevation of a part of the structure, being a view taken as indicated by line 5—5 on Fig. 1. Fig. 6 is an enlarged detailed plan section taken as indicated by line 6—6 on Fig. 1. Fig. 7 is an enlarged detailed plan section taken as indicated by line 7—7 on Fig. 1. Fig. 8 is an enlarged detailed sectional view taken as indicated by line 8—8 on Fig. 4. Fig. 9 is an enlarged detailed sectional view taken as indicated by line 9—9 on Fig. 5. Fig. 10 is an enlarged detailed sectional view taken as indicated by line 10—10 on Fig. 5. Fig. 11 is an enlarged detailed sectional view taken as indicated by line 11—11 on Fig. 1, and Fig. 12 is an enlarged detailed view of a portion of the structure illustrating a modified form of construction wherein the illuminating means is somewhat different from that illustrated in Figs. 1 to 11, inclusive.

The projector provided by the present invention involves, generally, a work holder A, a hood B over the work holder providing a shaft handling light reflected from work or an object on the holder, a projector head C at the upper end of the hook, mounting means D for the projector head, illuminating means E for work on the work holder A, and cooling means F.

The work holder A, in the preferred form of the invention, is a horizontally disposed platform having a flat top 10 suitable for carrying papers, books, and various objects or units of work, images of which are to be projected by the apparatus. In the form illustrated the work holder A is rectangular in plan configuration and the main section 11 of the work holder, which has the flat top 10, is substantially coextensive with the lower end of the hood B which will be hereinafter described.

In the preferred form of the invention the work holder A is provided with one or more shelf-like extensions 12 which may be employed at either or both sides of the holder, are provided with hook-like parts 15 which engage between the flanges 13 and lips 14 to releasably connect the extensions with the holder so that their tops 16 are substantially flush with the top 10 of section A. This construction is illustrated in Fig. 4 of the drawings.

The structure as shown in the drawings is also provided with a folding shelf or extension 17 at the front or forward edge of the work holder, as shown in Fig. 1 of the drawings. The shelf-like extension 17 is joined to the forward end of section 11 by a hinge connection 18 and a suitable folding support 19 is provided for holding the extension 17 in the up position and folds to allow the extension to be collapsed to a depending position, as indicated in dotted lines in Fig. 1.

The hood B occurs above the work holder A and preferably covers a substantial portion of the main section 11 of the work holder. The hood B is a vertically disposed structure or element that forms a light shaft conducting light reflected from work on the holder A upwardly to the projecting head C. In practice and in accordance with the principles of the invention, the hood may vary widely in form, size, shape and proportions. The hood B preferably forms a carrier or mounting for other parts of the structure, as will be hereinafter described.

In the particular form of the invention illustrated the hood B is an upwardly convergent or tapering structure substantially larger at its lower end than at its upper end. Work or articles handled by a device of the character under consideration is ordinarily in the nature of books, manuscripts, papers, etc., and it is therefore generally desirable that the work holder be rectangular in shape, as above described, and in such case it is preferred that the hood B be polygonal or rectangular in cross section or plan configuration, as shown throughout the drawings.

The hood illustrated involves side walls 20, a front wall 21 and a back wall 22. The several walls of the hood may be flat parts advantageously formed of sheet metal or the like, and it is preferred that the several walls be upwardly convergent or tapered, as shown throughout the drawings, so that they combine to form the upwardly convergent hood which fits the work holder at the lower end and the projector head at the upper end, which projector head is considerably smaller than the work holder. In practice the several walls of the hood are joined together at their edges into a rigid structure or unit.

In accordance with the present invention the hood is provided with one or more access openings to provide for convenient insertion of work or articles into the hood to be arranged on the work holder within the hood. In the preferred arrangement there are two access openings 25 located in the side walls 20 of the hood at the lower ends thereof to be adjacent the work holder A. Since the apparatus usually handles papers, books and like articles, it is generally practical to form the access openings 25 as horizontally disposed slots of limited vertical extent, as shown in the drawings.

The present invention provides a closure or light trap 26 for each access opening 25 and in practice the closures 26 may be formed of suitable flexible material such as a heavy fabric or the like, and the closures may be secured to the side walls 20 immediately above the access openings 25 so that the closures depend over and normally cover the access openings. By forming the closures 26 of flexible material they are subject to deflection to accommodate a projecting object or unit of work, as shown at the left in Fig. 2 of the drawings.

The present invention provides a hand hole 27 in the hood, preferably in the lower portion of the hood, the hand hole being so proportioned and located as to enable the operator to conveniently insert a hand into the hood to handle or act upon work on the holder within the hood. In the prefered form of the invention the hand hole 27 is located in the front wall 21 of the hood and is a large opening, as shown throughout the drawings. In the particular case illustrated the hand hole 27 includes the entire width of the front wall 21 and extends upwardly a substantial distance from the top of the work holder.

The hand hole 27 is provided with a closure 28 which is preferably a flexible flat or curtain-like structure involving one or more sections of a fabric or like material. In the preferred arrangement the closure 28 is formed of two overlapping sections X and Y of fabric or the like secured to the front wall 21 immediately above the hand hole 27 so that the sections normally depend and cover the hand hole but are easily parted or lifted to allow the operator's hand to enter the hood.

The present invention provides a sight opening 30 in the hood, which sight opening is so located as to enable the operator to conveniently view work on the holder within the hood. In the preferred construction the sight opening 30 is located in the front wall 21 of the hood and in practice it is preferably provided with a closure 31 of light filtering material such as colored glass or the like.

The projector head C is arranged at the upper end of the hood B where it is supported by the mounting means D and it serves, primarily, to receive light reflected from work on the support to direct it onto a screen. The head C illustrated throughout the drawings involves, generally, a housing 35 having a bottom opening 36 and a front opening 37, a reflector 38 located in the housing and a lens 39 carried by the housing and suitably related to the reflector. The housing 35 may, in practice, be a suitable cell-like structure formed of sheet metal, or the like.

A lens holder 40 is carried by the lower portion of the housing 35 to support the lens 39 in register with the bottom opening 36. In the drawings I have merely indicated a simple lens to receive reflected light from work on the holder so that an image of such work is directed onto the reflector 38 to be thereby directed onto a screen or the like. It is to be understood, of course, that any suitable lens such as a compound lens of any desired character may be employed in the head.

The reflector 38 is located in the housing 35 to be angularly disposed above the lens 39 to be in the path of light handled by the lens. In the case illustrated the reflector is a flat mirror or the like adjustably mounted in the housing 35 through a pivot or hinge connection 41. An adjusting screw 42 is provided in connection with the reflector and engages the reflector so that it normally supports the reflector in the desired relationship to the lens and screen which receives the image.

The front opening 37 of the housing 35 is preferably provided with a closure 43 which may, in practice be a clear transparency such as a glass plate, or the like.

The mounting means D provided for or carrying the projector head C supports the head C for vertical adjustment and is characterized by a vertical post or standard 50, preferably located at the exterior of the housing B, and a bracket 51 slidably carried by the post 50 and provided a part to which the head is applied.

The post 50 is preferably a simple straight vertically disposed element and it may be secured to the exterior of the housing B or parts thereon by suitable mounting devices 52. In the case illustrated the post is shown located at or immediately outside of the back 22 of the hood.

The bracket 51 is provided with spaced arms 56 which are slidably engaged on the post 50 and it has a laterally projecting lug 57 to which the head C is secured, it being preferred to releasably fasten the head to the lug 57 by a screw 58, as shown in the drawings. A pin 59 projects from one of the arms 56 of the bracket and operates in a vertical slot 60 in the post so that the bracket is maintained in the desired rotative position on the post. The post is held against rotation and the parts are arranged and related so that the bracket 51 supports the head C in register with the upper end of the hood B. In the form of the invention illustrated the arms 56 of the bracket 51 are split or divided and are provided with clamp screws 59 so that the bracket can be set in any desired vertical position on the post.

In practice the structure may include means for adjusting or operating the bracket 51 vertically on the post when the clamp screws 59 are released and this means may, in practice, involve sufficient friction so that it is not necessary to set the screws 59 in order to have the bracket remain in place to hold the head in the desired adjusted position. The particular operating means illustrated in the drawings involves a rack 65 fixed to the post 50, a pinion 66 carried on a shaft 67 and a mounting 68 applied to the bracket 51 and supporting the shaft so that the pinion 66 meshes with the rack. An operating knob 69 is provided on one end of the shaft 67 so that by rotating the shaft the bracket is operated vertically relative to the post.

The illuminating means shown in the form of the invention illustrated in Figs. 1 to 11, inclusive, is located in the hood and is provided to deliver light to work on the support A within the hood B. In practice the illuminating means involves one or more light sources which are preferably carried by the hood B. In the case illustrated the illuminating means involves two like light sources, one located adjacent and preferably carried by each side 20 of the hood in lateral extension 70 of the hood. Each light source involves, generally, a reflector 71 carried by the extension 70, and a lamp 72 located at or in the extension to generate light so that it is reflected onto the support A within the hood B.

The lateral extensions 70 on the sides 20 of the hood are preferably alike and as shown in the drawings each may involve front and rear walls 75 and 76, respectively, which are, in effect, extensions or continuations of the front and rear walls 21 and 22 of the hood B. A top 77 closes the extension and in the preferred arrangement it is so supported by the walls 75 and 76 as to be in a plane normal to an axis through the center of the work holder and the center of the extension 70. A bottom 78 closes the lower end or bottom of the extension, as shown in the drawings.

The reflector 71 of each unit of the illuminating means is preferably carried by a hood extension 70. In the drawings I have shown each reflector 71 as a concavo-convex shell-like part having a peripheral flange 80 by which it is secured to the exterior of the top 77 of a hood extension 70. The reflector 71 is so arranged that its concave side is inward and it is in register with an opening 82 provided in the top 77 on which it is mounted.

The lamp 72 is mounted in the hood extension 70 inward of and in line with the reflector 71. In practice the lamp 72 may be carried in a suitable socket 83 mounted on the bottom 78 of the hood extension. The lamp and reflector arrangement just described is clearly illustrated in Fig. 4 of the drawings, from which it will be apparent that light from the two lamps which are at opposite sides of the hood shines directly onto the work W located on the support A and light is caught by the reflectors 71 and is thereby directed onto the work W.

The work W illustrated in the drawings is in the nature of a book or pamphlet arranged on the work holder A. With the location of the lamps 72 in the hood extension 70, while the reflectors 71 are mounted on the hood extensions, the interior of the hood, as defined by the walls 20, 21 and 22, is left clear and wholly unobstructed so that light reflected by work W on the holder A passes up through the hood to the head to be directed thereby.

The cooling means F provided by the present invention involves primarily an air circulating device such as a motor driven blower 90 and a duct 91 handling air circulated by the device or blower 90 so that it is discharged into the hood B to have the desired cooling effect therein. In the preferred form of the invention illustrated in the drawings the motor driven blower 90 is located in a case 92 which is arranged beneath the work holder A and which forms a mounting for the work holder A.

The case 92 is shown as a box-like structure with depending walls 93 which define a chamber 94 in which the motor driven blower is located. The bottom of the box-like structure just described is open and legs 95 are provided to support this structure so that it is spaced somewhat above the table, platform, or other part 96 on which the apparatus is arranged. Through this construction cool air is free to enter the bottom of the case 92 to be received by the blower 90 and delivered thereby to the duct 91.

The duct 91 in its preferred form has a lower section 100 which receives the air from the blower and conducts it upwardly to the rear portion of the structure where it delivers it into an upper section 102 which is in the from of a manifold on the lower rear portion of the back wall 22 of the hood. The manifold section of the duct is of substantial width and extends over the rear sides 76 of the hood extensions 70.

In accordance with the preferred form of the invention an air delivering port 105 is provided in the rear wall 22 of the hood and passes air from the manifold section 102 onto the lower portion of the hood B. It is preferred, in practice, to provide an air directing baffle 106 at the port 105 so that if air is discharged from the port it is deflected downwardly and toward the center of the work holder.

Other air distributing ports may be provided to suitably distribute air from the manifold into the head. In the preferred form of the invention, as shown in the drawings air distributing ports 110 are provided in the rear walls 76 of hood extensions 70 so that air from the manifold section 102 is discharged into the hood extensions to cool the lamps 72 located therein.

It is to be observed that the upper end of the hood B is open and although it fits the projector head in a general way it leaves space 112 between the hood and the head from which air can readily escape from the hood. Further, it will be apparent that the several openings provided in the hood, as hereinabove described, which openings are normally closed by flexible closures, afford avenues of escape for air forced into the hood.

The form of illuminating unit illustrated in Fig. 12 involves a lamp 72ᵃ and a reflector 71ᵃ, and in addition to these parts it involves a suitable lens 120 in front of the lamp so that light from the lamp and reflector is directed by the lens onto work located at the holder. In this form of the invention the top of the hood extension 70ᵃ is provided with a dome-shaped cap or cover 126 similar in shape and mounting to the reflector 71 in the form of the invention first described. The reflector 71ᵃ is mounted inward of the cover 126 and is held in a suitable carrier 127. The lamp 72ᵃ is carried in a socket 83 to be immediately forward of the reflector and the lens 120 is carried in a holder 128 so that it is forward of the lamp. The several parts of the illuminating unit, that is, the reflector, the lamp and the lens are all located within the extension 70ᵃ of the hood.

In using the apparatus provided by the invention the object or work W is arranged in the hood B to be carried on the support A. For instance, it may be advantageously inserted through one of the access openings 25 and it may even have a part left projecting from the hood, as shown in Fig. 4 of the drawings. When the device is in operation the lamps 72 of the illuminating means are operating and the motor driven blower 90 of the means F is in operation. The light from the lamp 72 is effectively concentrated upon the work on the holder A and the light reflected upward from the work falls upon the lens of the projector head and is thereby directed onto the reflector of the head to be cast upon a suitable screen or the like. Suitable adjustment may be gained by shifting the head C vertically and while an image of the work is being projected the operator may reach into the hood through the hand hole 27 to arrange, shift, or manipulate the work to mark thereon or to indicate parts thereof, all in a manner to greatly aid in illustration or explanation. By providing illumination from two directions, as above described, any undesirable shadows are eliminated and by providing the cooling means F the operator may handle the work W in the hood in the manner above described, all without inconvenience or discomfort.

Having described only typical preferred forms and applications of my invention I do not wish to be limited or restricted to the specific details herein set forth, but wish to reserve to myself any variations or modifications that may appear to those skilled in the art and fall within the scope of the following claims:

Having described my invention, I claim:

1. A structure of the character described including, a rigid box-like body having a top forming a horizontal work holder, an upwardly convergent rigid hood carried by the body and projecting upward from the holder, the hood having a front wall with a hand hole, and side walls with outwardly projecting extensions, there being work passing openings in the side walls below said extensions and adjacent the holder, a reflector at each extension facing the holder, a lamp in each extension, a light projecting unit at the upper end of the hood receiving reflected light from work on the holder, and cooling means including a fan in the body and a duct receiving air from the fan and directing it into the hood.

2. A structure of the character described including, a rigid box-like body having a top forming a horizontal work holder, an upwardly convergent rigid hood carried by the body and projecting up from the top of the body and having a front wall with a hand hole adjacent the top of the body and a sight opening above the hand hole, a flexible closure for the hand hole, and side walls with outwardly projecting extensions with upwardly and inwardly pitched tops, there being work passing openings in the side walls below said extensions and adjacent the top of the body, flexible closures for said work passing openings, a reflector carried by the top of each extension and facing the holder, a lamp in each extension, a light projecting unit at the upper end of the hood receiving reflected light from work on the holder, means supporting the projecting unit from the hood for adjustment relative thereto, and cooling means directing cooling air into the hood including, a motor driven blower in the body, and a duct from the blower including a manifold at the exterior of the hood delivering air into the hood over the top of the body and at the extensions.

HAROLD G. FITZ GERALD.

REFERENCES CITED

The following references are of record in the file of this patent:

UNITED STATES PATENTS

| Number | Name | Date |
|---|---|---|
| 1,111,090 | Patterson | Sept. 22, 1914 |
| 1,202,754 | Patterson | Oct. 24, 1916 |
| 1,841,063 | Semenitz | Jan. 12, 1932 |
| 2,029,871 | Johnson | Feb. 4, 1936 |
| 2,273,936 | Ceroni | Feb. 24, 1942 |

FOREIGN PATENTS

| Number | Country | Date |
|---|---|---|
| 505 | Great Britain | of 1912 |
| 276,961 | Germany | July 23, 1914 |
| 453,142 | Germany | Nov. 29, 1927 |